United States Patent
Takamizawa

(10) Patent No.: US 7,078,663 B2
(45) Date of Patent: Jul. 18, 2006

(54) SCANNING LASER MICROSCOPE AND EXTERNAL SIGNAL RECORDING METHOD

(75) Inventor: Nobuhiro Takamizawa, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 923 days.

(21) Appl. No.: 10/183,718

(22) Filed: Jun. 27, 2002

(65) Prior Publication Data

US 2003/0007073 A1    Jan. 9, 2003

(30) Foreign Application Priority Data

Jul. 4, 2001    (JP)    ............................. 2001-204142

(51) Int. Cl.
*H01J 40/14*    (2006.01)
*G02B 27/46*    (2006.01)

(52) U.S. Cl. ............... 250/201.3; 250/234; 250/214 R; 359/368

(58) Field of Classification Search ............. 250/201.3, 250/234, 235, 214 R; 359/368, 391; 348/79
See application file for complete search history.

(56) References Cited

U.S. PATENT DOCUMENTS 6,717,723 B1 * 4/2004 Arai ........................... 359/368

FOREIGN PATENT DOCUMENTS

JP    08-287860 A    11/1996

* cited by examiner

*Primary Examiner*—Kevin Pyo
(74) *Attorney, Agent, or Firm*—Frishauf, Holtz, Goodman & Chick, P.C.

(57) ABSTRACT

A scanning laser microscope is configured to include: a scanner unit for performing two-dimensional scanning on a specimen using a light beam; a photodetector unit for detecting a light from the specimen; an A/D converter for converting an output signal from the photodetector unit into a digital signal; a CPU for controlling the scanner unit and generating image data of the specimen from the digital signal output from the A/D converter; a display unit for displaying the image data; an external device for outputting an external signal; and a data storage unit, connected to the external device, for recording the time when the external signal is output. With the configuration, the data stored in the data storage unit can be read by the CPU.

14 Claims, 7 Drawing Sheets

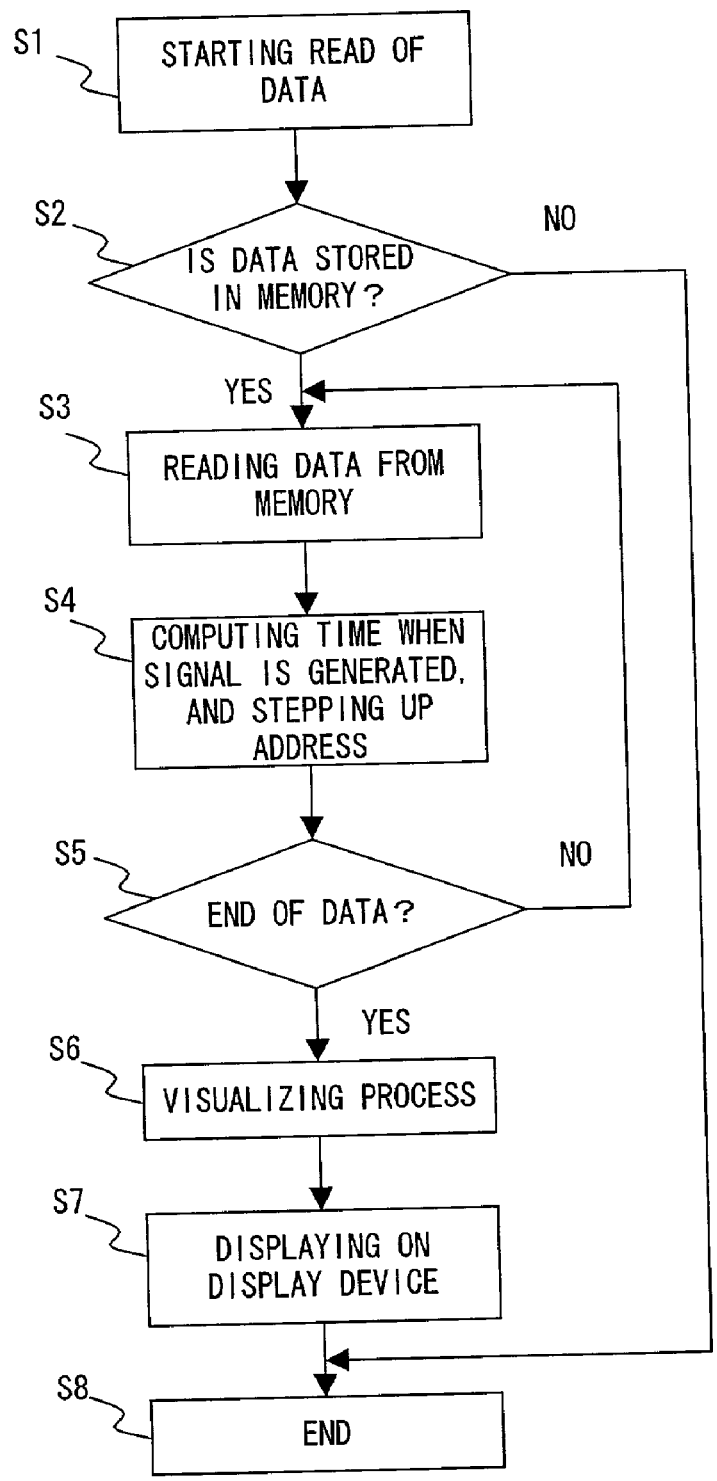
F I G. 3

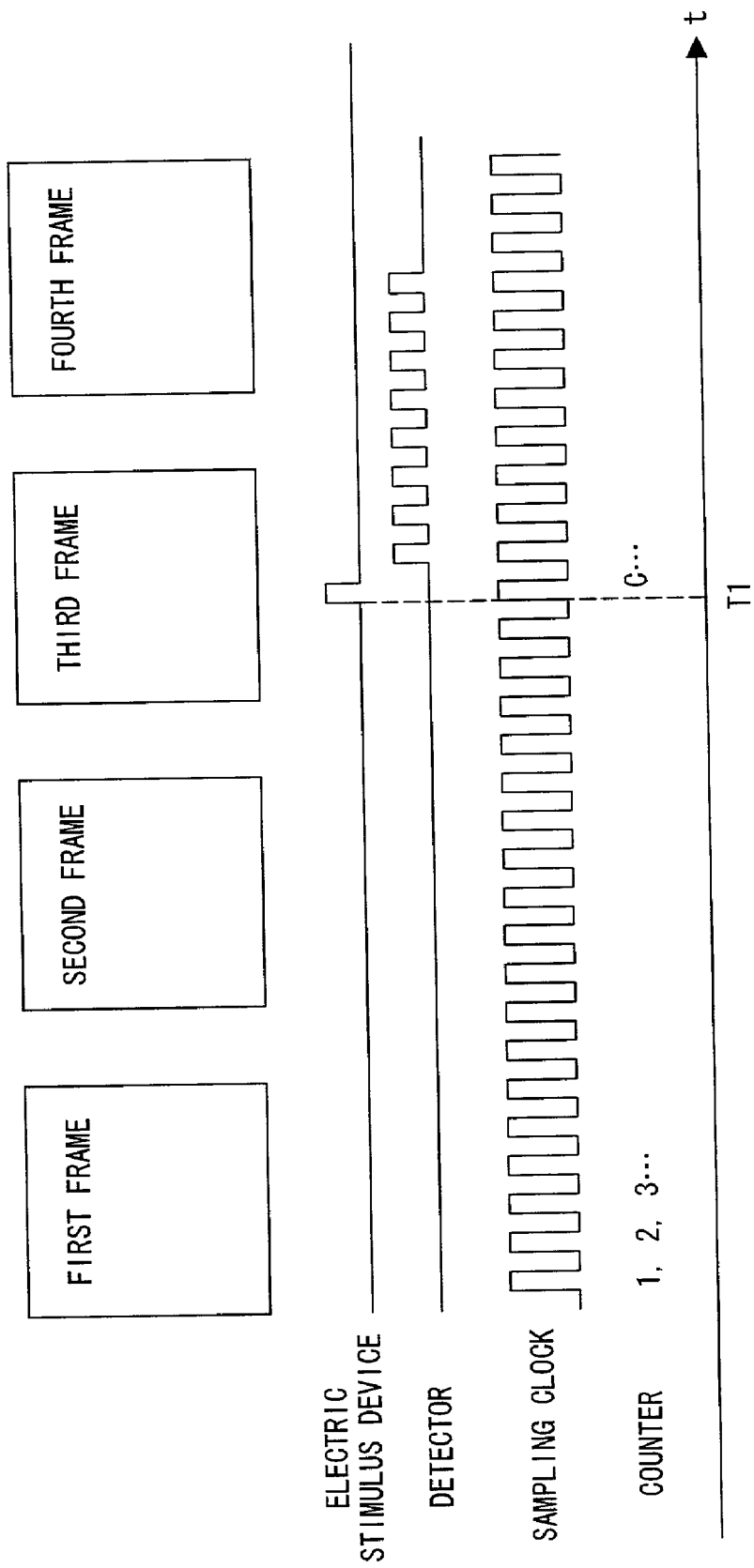
F I G. 5

SCANNING LASER MICROSCOPE AND EXTERNAL SIGNAL RECORDING METHOD

BACKGROUND OF THE INVENTION

1. Field of the Invention

The present invention relates to the technology applied to the technological field of a scanning laser microscope.

2. Description of the Related Art

Conventionally, a scanning laser microscope has been well known as an apparatus for irradiating a specimen (sample) with a light beam from a light source for two-dimensional scanning, detecting a light (a reflected light, a transmission light, fluorescence, etc.) from the specimen using a photodetector, converting the detected light into an electric signal by a photoelectric transducer, and obtaining image data.

Briefly described below is the configuration and the operation of the conventional scanning laser microscope.

A specimen is irradiated with a light beam from a light source for two-dimensional scanning, a light (a reflected light, a transmission light, fluorescence, etc.) depending on the material and the shape of the specimen is detected by a photodetector, and the detected light is converted into an electric signal by a photoelectric transducer. Then, a converted electric signal is converted into image data which is a digital signal by an A/D converter, and the obtained image data is stored in the image memory. An image based on the image data stored in the image memory is displayed on a display unit of a computer.

Thus, when a specimen is observed using a scanning laser microscope, an image of the specimen is obtained by obtaining image data depending on the specimen, and simultaneously, for example, it can be necessary to measure and store the reaction of a target under observation (specimen) such as a cell, etc. which changes with time in a given period by a change of the temperature or the stimulus given to the cell.

In this case, the CPU of a computer controlling the scanning laser microscope performs the process of controlling a scanning laser microscope such as light beam scanning, etc., manipulating image data, transferring and displaying an image of the image data, etc., records the data obtained from an external detector (various sensors, etc.), various input device, etc. in real time, performs a visualizing process by preparing a graph, etc. from the recorded data as necessary, and displays the result on the display device connected to the computer. The data obtained from the above mentioned external detector, various input device, etc. is an example of an external signal, and can be referred to as an event signal.

As described above, the CPU which enters a high load state by simultaneously performing various processes such as light beam scanning, fetching image data, etc. is sometimes incapable of immediately responding to an event signal. As a result, there can be undesired delay between the timing in inputting an event signal, that is, the timing in generating the event signal, and the timing in recording the event signal.

If an event signal (including an interruption signal, etc.) is input into the CPU in the high load state during the two-dimensional scanning in the conventional scanning laser microscope, then the CPU cannot immediately respond to the signal, and there occurs a delay between the time when the event signal occurs and the time when a response is returned.

Regarding the problem, for example, Japanese Patent Laid-open No. Hei 8-287860 discloses the technology of improving the response time from the start of an operation to due control by directly providing a SEM (scanning electronic microscope) control unit with a command relating to a more responsive process when a SEM control command is issued to the SEM control unit as an operation signal by input unit such as a keyboard, a mouse, etc.

As described above, if the CPU of a computer simultaneously performs various processes such as control of the scanning laser microscope by light beam scanning, etc., manipulation of image data, monitor of various sensors, storage and process of signals obtained from various sensors, etc., then a heavy load is applied to the CPU, for example, the CPU cannot immediately respond to signals (event signals) from various sensors, and there occurs a delay between the time when the signals from various sensors are generated and the time when the signals are stored.

SUMMARY OF THE INVENTION

The present invention has been developed to solve the above mentioned problem, and the scanning laser microscope according to the first aspect of the present invention is configured to include: a scanner unit for performing two-dimensional scanning on a specimen using a light beam; a photodetector unit for detecting a light from the specimen; an A/D converter for converting an output signal from the photodetector unit into a digital signal; a CPU for controlling the scanner unit and generating image data of the specimen from the digital signal output from the A/D converter; a display unit for displaying the image data; an external device for outputting an external signal; and a data storage unit, connected to the external device, for recording the time when the external signal is output. With the configuration, the data stored in the data storage unit can be read by the CPU.

BRIEF DESCRIPTION OF THE DRAWINGS

FIG. 3 is a flowchart showing an example of a data reading process from the data storage unit;

FIG. 5 is a time chart showing image data, a trigger signal, a signal from a sensor 21, and a counter value obtained in synchronization with a sampling clock;

DESCRIPTION OF THE PREFERRED EMBODIMENT

The embodiments of the present invention are described below by referring to the attached drawings.

Figure 1:
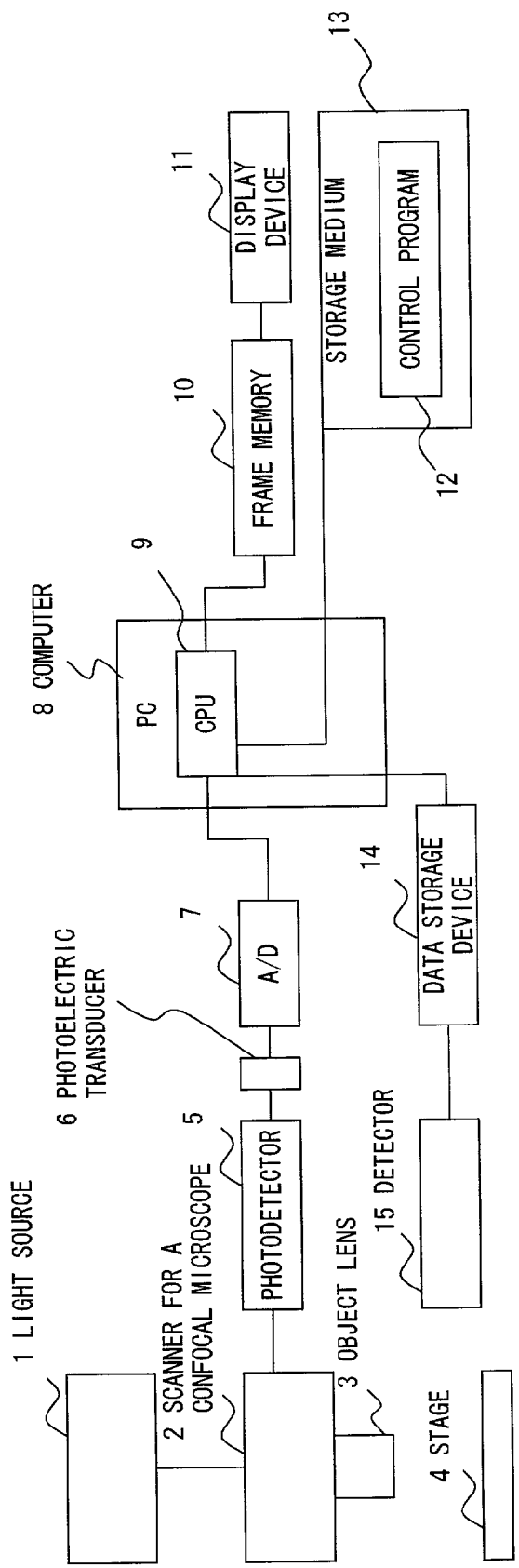
FIG. 1 shows an example of a configuration of the scanning laser microscope according to an embodiment of the present invention.

FIG. 1 shows an example of a configuration of the scanning laser microscope according to an embodiment of the present invention.

The scanning laser microscope comprises a light source 1, a scanner 2 for a confocal microscope, an object lens 3, a stage 4, a photodetector 5, a photoelectric transducer 6, an A/D converter 7, a computer (PC) 8 provided with a CPU 9, frame memory 10, a display device 11, a storage medium 13 storing (recording) a control program 12, a data storage device 14, and a detector 15 which is an external device (external connection unit).

A light beam from the light source 1 is emitted from the object lens 3, the scanner 2 for a confocal microscope scans a specimen (sample) placed on the stage 4 in a two-dimensional scanning process, the photodetector 5 detects the light (a reflected light, a transmission light, or fluorescence, etc.) depending on the material and the shape of the specimen, and photoelectric transducer 6 converts the detected light into an electric signal. The A/D converter 7 is connected to the CPU 9 of the computer 8, and converts an electric signal converted by the photoelectric transducer 6 into image data which is a digital signal.

The obtained image data is stored in the frame memory 10 connected to the CPU 9. The image data stored in the frame memory 10 is then read by the computer 8 and an image based on the image data is displayed on the display device 11.

The detector 15 is connected to the data storage device 14, and the data storage device 14 is connected to the CPU 9 of the computer 8.

The CPU 9 controls the operations of the entire scanning laser microscope including the detector 15 by reading and executing the control program 12 stored in the storage medium 13.

It is also possible to store the control program 12, which is now stored in the storage medium 13, in a portable storage medium such as CD-ROM, a floppy disk, etc., read the control program 12 stored in the portable storage medium by the CPU 9, and control the operations. Otherwise, the control program 12 can be stored in the storage medium of the external device such as a server device, etc. the computer 8 communicates with the server device, and the control program 12 can be read from the storage medium and executed, thereby controlling the operations.

Figure 2:
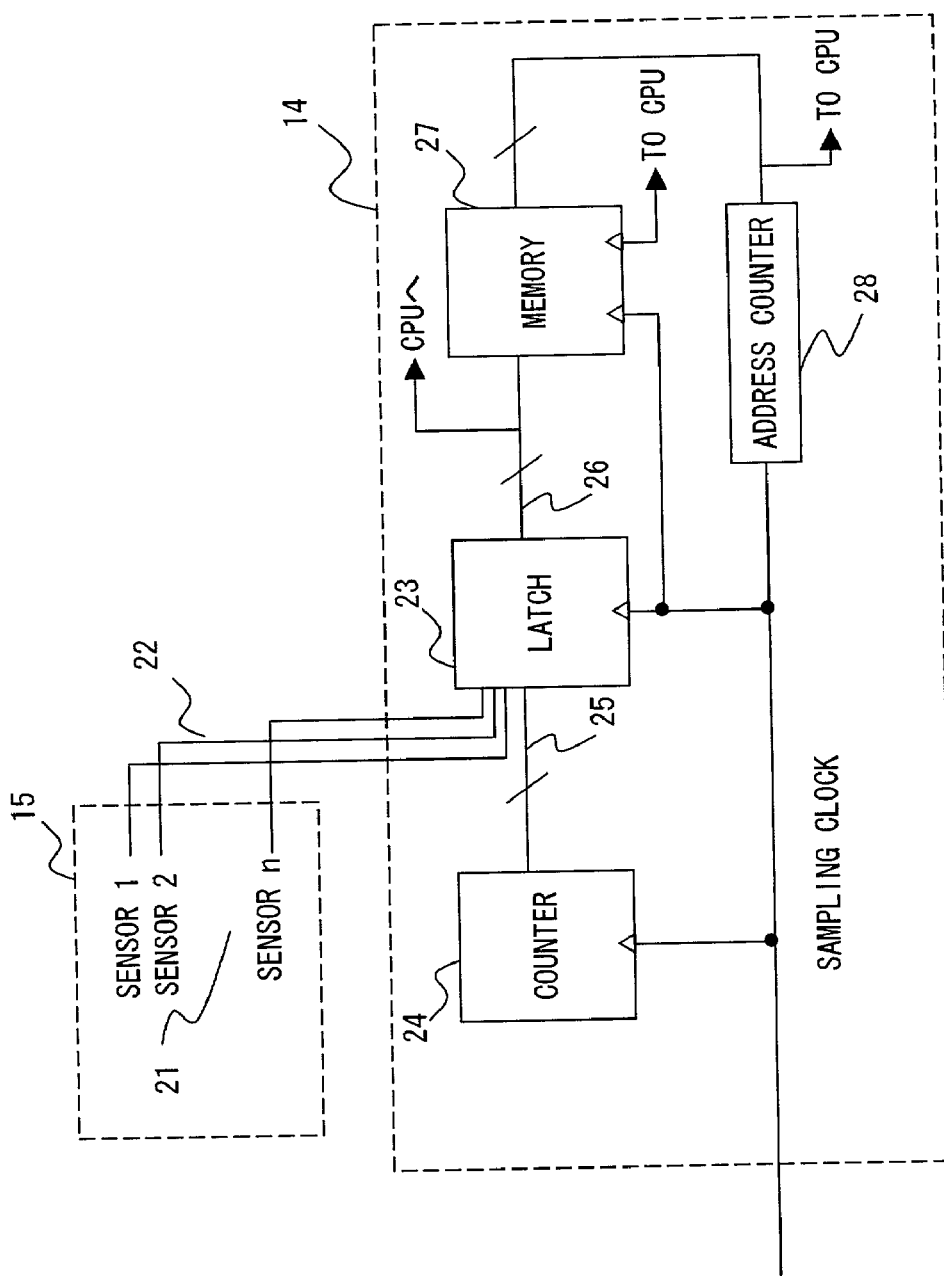
FIG. 2 shows an example of a configuration of the data storage unit.

FIG. 2 shows an example of a configuration of the data storage device 14.

In FIG. 2, the n sensors 21 (hereinafter the n sensor 21 can also be referred to simply as the sensors 21) provided for the detector 15 connected to the data storage device 14 are connected to a latch circuit 23 through n signal lines 22.

The sensors 21 can be, for example, a sensor for detecting a temperature, a sensor for detecting pH, a sensor for detecting a flow rate, a sensor for detecting Co, a sensor for detecting a signal from an external device, a sensor for detecting a signal of a manual switch, etc. A signal output from the sensors 21 is an example of an external signal, and can also be referred to as an event signal.

The latch circuit 23 and an address counter 28 are connected to the CPU 9.

A counter circuit 24 is connected to the latch circuit 23 through m signal lines 25, and the latch circuit 23 is connected to memory 27 and the CPU 9 through m+n signal lines 26.

The counter circuit 24, the latch circuit 23, the memory 27, and the address counter 28 operate in synchronization with a sampling clock when the electric signal converted by the photoelectric transducer 6 is converted into image data which is a digital signal.

The latch circuit 23 latches the m+n bit data from the sensors 21 and the counter circuit 24 at the same timing as the sampling clock, that is, in synchronization with the sampling clock, and stores the latched data in the memory 27.

The address counter 28 counts the address of the memory 27 in synchronization with the sampling clock, and designates the storage address of the data in the memory 27.

The memory 27 stores the m+n bit data from the latch circuit 23 at the address designated by the address counter 28 in synchronization with the sampling clock.

The CPU 9 for executing the control program 12 reads data stored in the memory 27 at any timing when the load of the CPU 9 is reduced, for example, after the light beam scanning is completed, etc., performs a visualizing process such as preparing a graph, etc., and displays the data on the display device 11 after the visualizing process.

According to the present embodiment, it is possible to simultaneously or individually display the data after the visualizing process and the image based on the above mentioned image data. For example, the data after the visualizing process can be displayed on a display unit different from the display device 11. Thus, the data after the visualizing process can be displayed on the display unit, and the image based on the above mentioned image data can be displayed on the display device 11.

Described below is the process of reading data from the data storage device 14, which is one of the control processes realized by the CPU 9 reading and executing the control program 12 stored in the storage medium 13.

FIG. 3 is a flowchart showing an example of a process of reading data from the data storage device 14.

In FIG. 3, in step S1, the CPU 9 for executing the control program 12 issues a data read instruction to the data storage device 14.

In step S2, it is determined whether or not data is stored in the memory 27. If the determination result is YES, then control is passed to step S3. If the determination result is NO, then control is passed to step S8, and the process flow terminates.

In step S3, the data having an m+n bit data width stored in the memory 27 is read. As described above, in the data having an m+n bit data width, m-bit data indicates a counter value, and n-bit data indicates a signal from the sensor 21.

In step S4, based on the data having an m+n bit data width read in the previous step, the generation time of the signal from the sensor 21 is computed. The computation is performed by the following equation (1).

$$\text{Time} = (1/S) * C \qquad \text{equation (1)}$$

where Time indicates the generation time of a signal from the sensor 21 (the elapsed time from the start of scanning to the generation of an external signal); S indicates a sampling clock; and C indicates a counter value (m-bit data). Thus, since the generation time of the signal from the sensors 21 is obtained based on the counter value, the counter value can be considered to indicate the generation time of the signal from the sensors 21.

When the computation of the generation time of the signal from the sensors 21 is completed, the memory address for read of the next data having an m+n bit data width from the memory 27 is stepped up by 1.

In step S5, it is determined whether or not the data having an m+n bit data width has completely been read. If the determination result is Yes, then control is passed to step S6. If the determination result is NO, then control is returned to step S3, and the processes of reading the above mentioned data, etc. are repeated.

In step S6, the visualizing process such as preparing a graph, etc. is performed according to the generation time of the signal from the sensor 21 computed in step S4 as obtained from the data having an m+n bit data width read in step S3, and the signal (n-bit data) from the sensor 21.

In step S7, data is displayed on the display device 11 based on the visualizing process in the previous step, and control is passed to step S8, thereby terminating the process flow.

Described below is the operation performed when an image of a specimen is obtained, for example, by obtaining image data corresponding to the image of a specimen (the image of a sample) in the scanning laser microscope with the configuration as described above, and simultaneously recording the signal from an external device by referring to FIGS. 4 and 5.

However, practically described below is an example, that is, the case in which an electric stimulus is applied to a target specimen under observation, and a physiological reaction on the specimen to the electric stimulus is recorded as time-series images.

The operation is realized by the CPU 9 reading the control program 12 stored in the storage medium 13.

Figure 4:
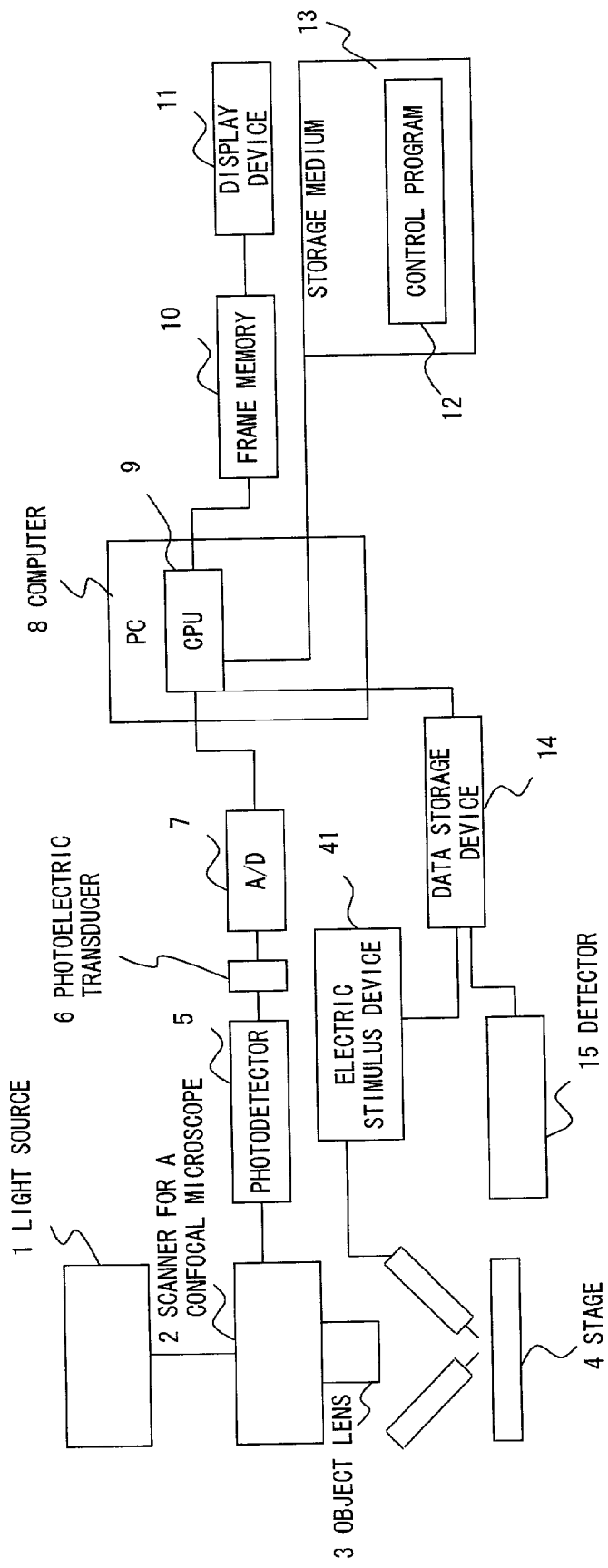
FIG. 4 shows an example of a configuration of the scanning laser microscope including an electric stimulus device.

FIG. 4 shows an example of a configuration of the scanning laser microscope including an electric stimulus device.

In FIG. 4, an electric stimulus device 41 is connected which is an external device to the data storage device 14. The electric stimulus device 41 applies an electric stimulus to a specimen, and outputs a trigger signal when it applies the electric stimulus. The output trigger signal is directly input into the latch circuit 23 of the data storage device 14, and the latch circuit 23 can latch the trigger signal. The trigger signal is an example of an external signal, and can be referred to as an event signal.

The electric stimulus device 41 can be controlled by the CPU 9 reading the control program 12 stored in the storage medium 13, or can operate independent of the CPU.

The sensors 21 of the detector 15 shown in FIG. 4 detects a physiological reaction of a specimen when the electric stimulus device 41 applies an electric stimulus to the specimen. However, only in this example, the total number of sensors 21 of the detector 15 is n−1, and it is assumed that output from the n−1 sensors 21 is input into the latch circuit 23.

Otherwise, the configuration is as shown in FIG. 1.

FIG. 5 is a time chart of image data, a trigger signal, a signal from the sensors 21, and a counter value obtained in synchronization with a sampling clock. In FIG. 5, an electric stimulus device indicates a trigger signal output from the electric stimulus device 41, a detector indicates a signal from the sensors 21 output from the detector 15, and a counter indicates a counter value (C).

As shown in FIG. 5, the scanning laser microscope records various data in synchronization with a sampling clock which is a reference signal for recording.

For example, when the two-dimensional scanning is performed on the specimen and the signal from the photodetector 5 is converted into the image data which is a digital signal by the photoelectric transducer 6, the image data is stored in the frame memory 10 for each frame. Then, the image data is read as necessary and displayed on the display device 11.

If the electric stimulus device 41 applies an electric stimulus to a specimen at the time T1 during the scanning on the specimen, then a trigger signal output from the electric stimulus device 41 is recorded for the tie T1, the sensors 21 of the detector 15 detects the physiological reaction of the specimen at and after the time T1, a signal from the sensors 21 is stored in synchronization with a sampling clock.

In the example shown in FIG. 5, a trigger signal is output by the electric stimulus device 41 applying an electric stimulus to the specimen at the time T1, and the trigger signal is stored by the data storage device 14.

By the sensors 21 of the detector 15 detecting the physiological reaction of a specimen generated by an electric stimulus at the time T1, the signal from the sensors 21 depending on the detection is stored in the data storage device 14.

The above mentioned operation is described below further in detail.

The latch circuit 23 latches the n−1 bit data which is a signal from the n−1 sensors 21, the 1-bit data which is a trigger signal from the electric stimulus device 41, and the counter value C (m-bit data) in synchronization with a sampling clock, and outputs the latched data to the memory 27.

Thus, each piece of data each having an m+n bit data width at and after the time T1 is stored in the memory 27.

When the load of the CPU 9 is reduced, for example, when the light beam scanning, etc. is completed, the CPU 9 reads the data having an m+n bit data width stored in the memory 27 of the data storage device 14 at an arbitrary timing, and extracts m-bit data indicating the counter value C, a trigger signal, and n-bit data which is a signal from the sensors 21.

The CPU 9 obtains the time when the trigger signal is output when the electric stimulus device 41 applies a electric stimulus to the specimen, and the time when the signal from the sensors 21 is generated as a physiological reaction of the specimen detected by the detector 15 using the counter value which is the extracted m-bit data and the sampling clock by the above mentioned equation (1).

By computing using the equation (1) the time changed from the trigger signal and the signal from the sensors 21 for all data (all data having an m+n bit data width) stored in the memory 27 from the start of scanning the specimen to the end of the scanning, the time-series data relating to the change of the trigger signal and the signal from the sensors 21 from the start to the end of the scanning can be obtained.

Then, the visualizing process performed on the obtained time-series data, for example, a process of preparing a graph, etc. is performed, and the visualized data is displayed on the display device 11.

In the above mentioned operation, by storing the trigger signal and the signal from the sensors 21 and the counter value indicating the time when the signal is generated in the memory 27, it is not necessary for the CPU 9 to constantly monitor the change of a signal from the sensors 21 and record the signals.

Therefore, although the CPU 9 performs a heavy load process such as the control process of the scanning laser microscope such as a light beam scanning process, etc., or an image data process, etc., a trigger signal and a signal from the sensors 21 can be correctly recorded without generating a delay between the generation of the trigger signal and the signal from the sensors 21 and the records of the signals.

In the above mentioned operation, the trigger signal and the signal from the sensors 21 are recorded in synchronization with the sampling clock when the electric signal converted by the photoelectric transducer 6 is converted into image data which is a digital signal. Therefore, the generation times of the trigger signal and the signal from the sensors 21 during the scanning on the specimen, the points on the specimen corresponding to the times, the state of the signal from the sensors 21 at the time, the time from the start of the scanning to the time when the trigger signal and the signal from the sensors 21 are generated can be easily obtained.

In an example of an operation explained by referring to FIGS. 4 and 5, excluding the detector 15, the latch circuit 23 can be configured such that only the trigger signal output from the electric stimulus device 41 and the output signal of the counter circuit 24 can be latched.

Furthermore, in an example of an operation explained by referring to FIGS. 4 and 5, the electric stimulus device 41 is used as an external device for applying a stimulus to a specimen. A chemicals applying device for applying a stimulus to a specimen by applying chemicals to a specimen can also be used as the external device. However, in this case, the chemicals applying device is a device for applying chemicals to a specimen, and a trigger signal is output when the chemicals are applied.

In an example of an operation explained above by referring to FIGS. 4 and 5, the electric stimulus device 41 is connected to the data storage device 14, and a trigger signal output from the electric stimulus device 41 is input into the latch circuit 23 of the data storage device 14. For example, the electric stimulus device 41 can be connected to the detector 15 such that the trigger signal output from the electric stimulus device 41 can be input into one of the n sensors 21, and the trigger signal can be input and latched into the latch circuit 23 of the data storage device 14 as one of the signals from the n sensors 21.

Described below are other examples of the configurations of the data storage device 14.

Figure 6:
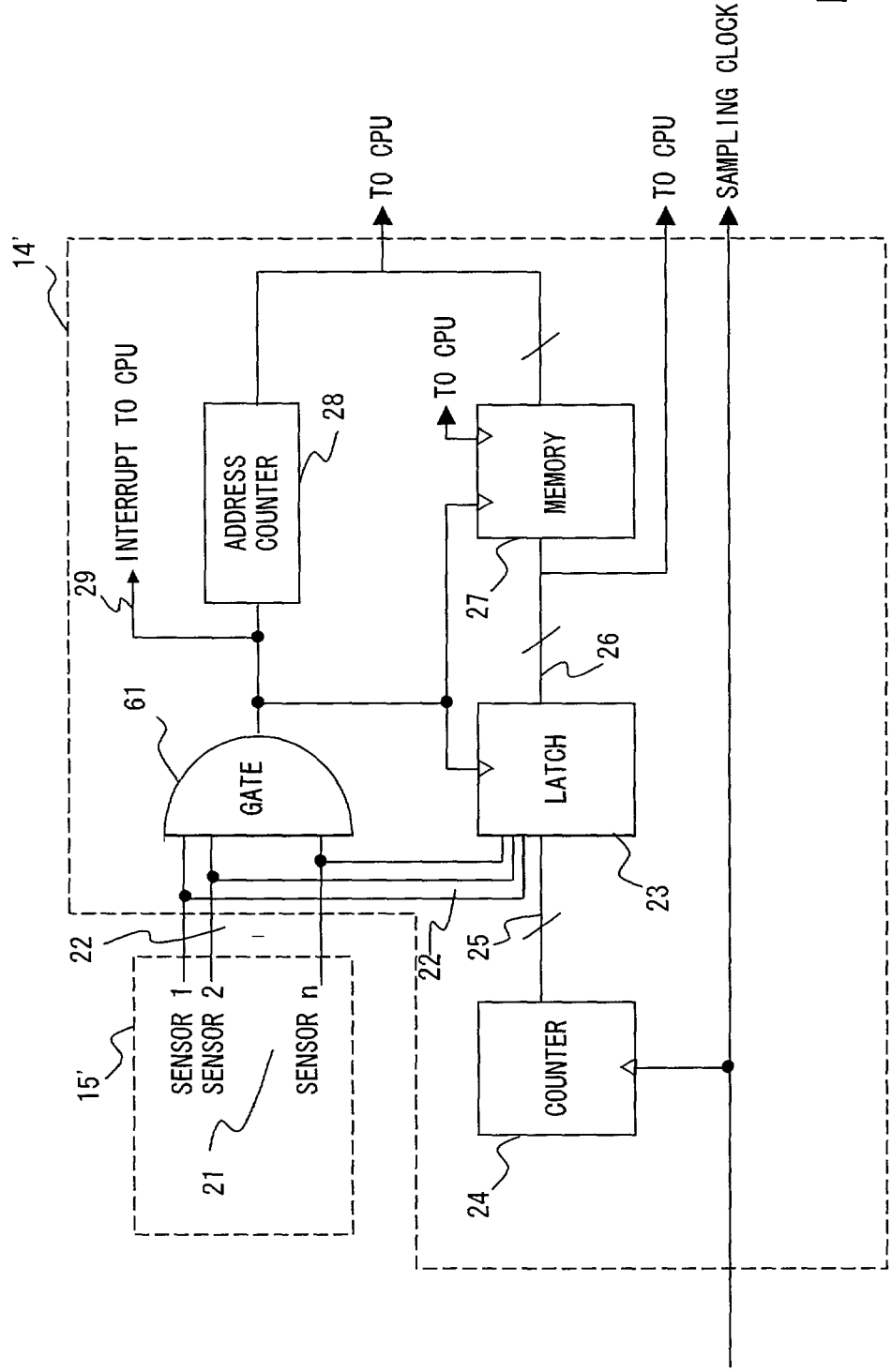
FIG. 6 shows the second example of a configuration of the data storage unit.

FIG. 6 shows the second example of a configuration of the data storage device 14. In FIG. 6, the data storage device 14 is expressed as 14', and the detector 15 is expressed as 15'.

The n sensors 21 provided in the detector 15' connected to the data storage device 14' are connected to a gate circuit 61 and the latch circuit 23 through the n signal lines 22.

The gate circuit 61 inverts an output signal when there is a change in the signal from the sensor 21 input through the signal line 22. For example, if there is a change in the input signal from the sensor 21 when the output signal of the gate circuit 61 is "0", then "1" is output as an output signal.

The sensor 21 is connected to a latch circuit through the n signal lines 22, the counter circuit 24 is connected to the latch circuit 23 through m signal lines 25, and the latch circuit 23 is connected to the memory 27 and the CPU 9 through the m+n signal lines 26.

The latch circuit 23 is also connected to the output of the gate circuit 61, latches the m+n bit data which is a signal (n-bit data) from the sensors 21 and a signal (m-bit data) from the counter circuit 24 in synchronization with the output signal from the gate circuit 61, and outputs the latched data to the memory 27.

The memory 27 stores the m+n bit data latched by the latch circuit 23 at the address specified by the address counter 28.

The counter circuit 24 steps up the count by 1 in synchronization with the sampling clock using the sampling clock as an input signal.

If any of the signals from the sensors 21 changes, for example, from "1" into "0" or from "0" into "1", then the output signal of the gate circuit 61 changes.

The output signal of the gate circuit 61 is input into the latch circuit 23, the memory 27, and the address counter 28, and the latch circuit 23 latches the m+n bit data from the sensors 21 and the counter circuit 24 in synchronization with the output of the gate circuit 61.

Each time the output signal of the gate circuit 61 changes, the address counter 28 updates the address, and designates the memory 27 of the destination of the data.

In synchronization with the output signal of the gate circuit 61, the memory 27 stores the m+n bit data from the latch circuit 23 at the address designated by the address counter 28.

A signal line 29 for interruption into the CPU 9 is a signal line for use in interruption of a signal from the sensors 21 into the CPU 9 when the signal from the sensors 21 changes. Whether or not the CPU 9 accept the interruption can be set in advance.

With the above mentioned configuration of the data storage device 14', only the counter value indicating the time of the moment the signal from the sensors 21 changes, that is, the moment when the change of the signal from the sensors 21 occurs, and the signal from the sensors 21 at the moment are stored in the memory 27. Therefore, as compared with the configuration of the data storage device 14 shown in FIG. 2, the amount of data stored in the memory 27 can be reduced, thereby saving the memory capacity.

In addition, as described above, the CPU 9 reads data stored in the memory 27 at any timing when the load of the CPU 9 is reduced, for example, after the light beam scanning is completed, etc., performs a visualizing process on the read data, and displays the visualized data on the display device 11.

Using the data storage device 14', the operations performed when an image of a specimen is obtained, and a signal from an external device is simultaneously stored, are performed as, for example, the operations described above by referring to FIGS. 4 and 5. However, in this case, the timing of the latch by the latch circuit 23 is only the moment when the signal from the sensors 21 changes.

As described above, since the signal from the sensors 21 and the counter value indicating the time when the signal is generated are stored in the memory 27 using the data storage device 14' with the configuration shown in FIG. 6, it is not necessary for the CPU 9 to monitor the signals from the sensors 21 and record the signals.

Therefore, although a heavy load process is performed by controlling a scanning laser microscope such as light beam scanning, etc., processing an image, etc., there is no delay between the occurrence of a signal from the sensors 21 and the record of the signal, thereby correctly recording the signal from the sensors 21.

Furthermore, since the latch circuit 23 latches a signal (n-bit data) from the sensors 21 only when the signal from the sensors 21 changes, the memory capacity of the memory 27 can be saved.

Additionally, since the signal from the sensors 21 is recorded together with the counter value from the counter circuit 24 operating in synchronization with the sampling clock, the point on the specimen where a signal is generated from the sensors 21 during the scanning, the state of the signal from the sensors 21 when it is generated, or the time taken from the start of the scanning to the generation of the signal can be easily obtained.

Figure 7:
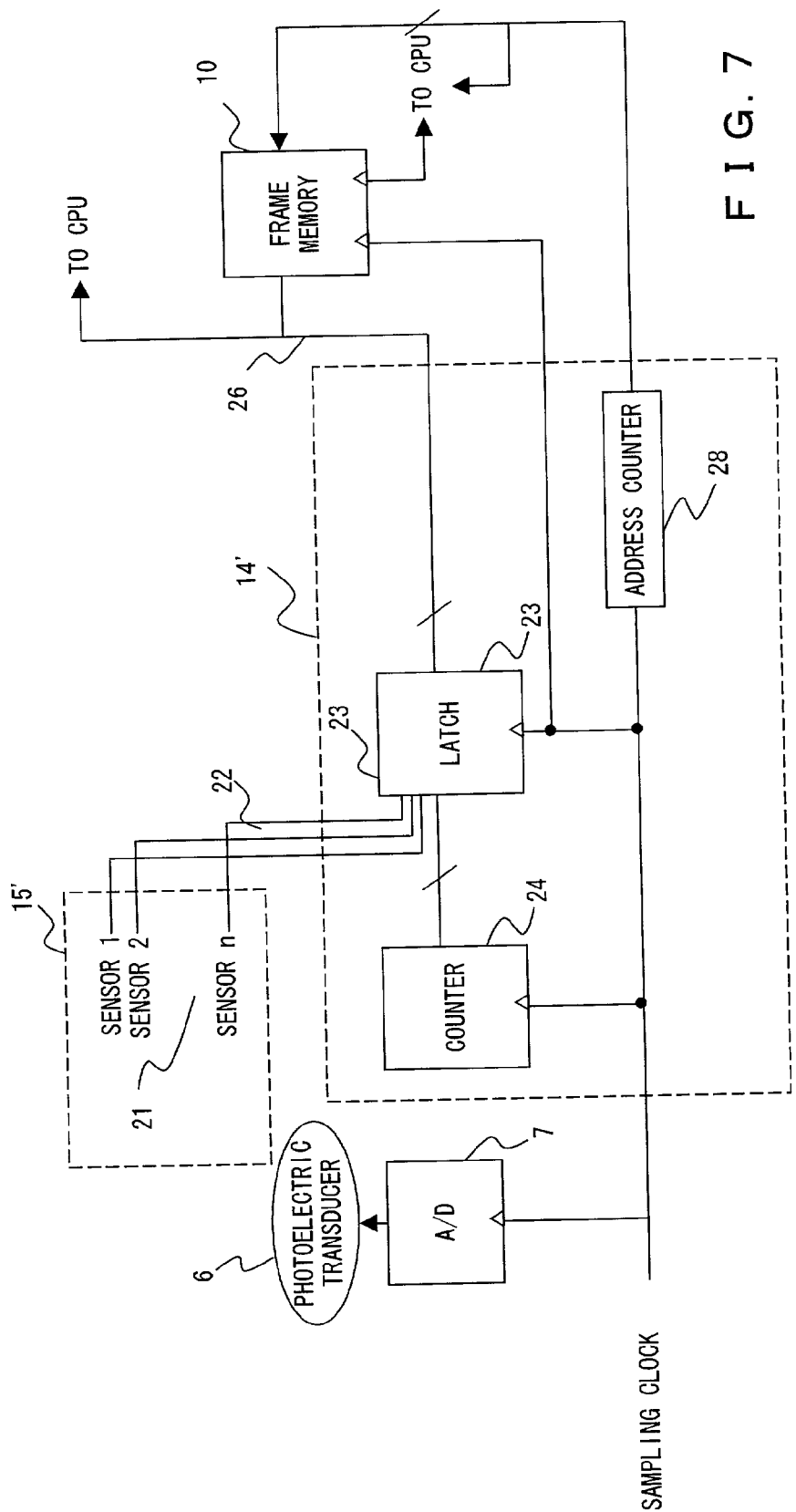
FIG. 7 shows the third example of a configuration of the data storage unit.

FIG. 7 shows the third example of a configuration of the data storage device 14.

In FIG. 7, the data storage device 14 is expressed as 14', and the detector 15 is expressed as 15'. However, with the configuration shown in FIG. 7, the memory 27 of the data storage device 14 shown in FIG. 2 is omitted, and the output data of the latch circuit 23 is designed to be input into the frame memory 10.

In FIG. 7, the n sensors 21 provided in the detector 15' connected to the data storage device 14' are connected to the latch circuit 23 through the n signal lines 22.

The counter circuit 24 is connected to the latch circuit 23 through the m signal lines 25, and the latch circuit 23 is connected to the frame memory 10 and the CPU 9 through the m+n signal lines 26.

The address counter 28 is connected to the latch circuit 23, and to the frame memory 10.

The photoelectric transducer 6 is connected to the A/D converter 7, and the A/D converter 7 is connected to the frame memory 10.

The counter circuit 24, the latch circuit 23, the frame memory 10, and the address counter 28 operate in synchronization with the sampling clock when an electric signal converted by the photoelectric transducer 6 is converted into image data which is a digital signal.

The latch circuit 23 latches the m+n bit data from the sensors 21 and the counter circuit 24 in synchronization with the sampling clock, and stores the latched data in the frame memory 10.

Assuming that the resolution of the A/D converter 7 is X bits, and the data length of the frame memory 10 is Y bits, the following equation exists.

$$Y=(m+n)+X$$

The address counter 28 counts the address of the frame memory 10 in synchronization with the sampling clock, and designates the frame memory 10 of the destination of the data.

The frame memory 10 stores m+n bit data from the latch circuit 23 and the X-bit image data from the A/D converter 7 at the address designated by the address counter 28 in synchronization with the sampling clock.

With the configuration, the frame memory 10 for storing image data obtained through the photoelectric transducer 6 is used as the memory for storing the signal from the sensors 21 and the counter value indicating the generation time of the signal. Therefore, it is not necessary to provide the memory 27 shown in FIGS. 2 and 6, thereby simplifying the configuration of the device.

Using the data storage device 14' with the configuration shown in FIG. 7, the operations performed when an image of a specimen is obtained, and a signal from an external device is simultaneously stored, are performed as, for example, the operations described above by referring to FIGS. 4 and 5.

As mentioned above, with the configuration shown in FIG. 7, a signal from the sensors 21 can be correctly recorded by providing the data storage device 14' and latching the signal from the sensors 21 and the counter value in synchronization with the sampling clock.

Furthermore, by allowing the frame memory 10 to record the signal from the sensors 21 and the counter value indicating the time when the signal is generated, it is not necessary for the CPU 9 for controlling the scanning laser microscope to monitor the signals from the sensors 21 and record the signals.

Therefore, although a heavy load process is performed by controlling a scanning laser microscope such as light beam scanning, etc., processing an image, etc., there is no delay between the generation of a signal from the sensors 21 and the record of the signal, thereby correctly recording the signal from the sensors 21.

As described above in detail, according to the present invention, in the scanning laser microscope, although the CPU is in the heavy load state by the control of the scanning laser microscope by obtaining an image of a specimen, scanning a light beam, etc., a signal from an external device such as a sensor, etc. can be recorded in real time. Therefore, there can be no delay between the generation of the signal and the record of the signal. Furthermore, the point on a specimen when a signal from an external device is generated, or a time taken from the start of the scanning to the generation of the signal from the external device can be easily obtained.

As described above, the present invention has been described in detail, but the present invention is not limited to the above mentioned embodiments, but various improvement and changes can be obviously permitted in the scope of the gist of the present invention.

What is claimed is:

1. A scanning laser microscope, comprising:
   a scanner unit performing two-dimensional scanning on a specimen using a light beam;
   a photodetector unit detecting a light from the specimen;
   an A/D converter converting an output signal from said photodetector unit into a digital signal;
   a CPU controlling said scanner unit and generating image data of the specimen from the digital signal output from said A/D converter;
   a display unit displaying the image data;
   an external device outputting an external signal; and
   a data storage unit, connected to said external device, recording a time when the external signal is output, wherein
   the data stored in said data storage unit can be read by said CPU.

2. The scanning laser microscope according to claim 1, wherein
   said data storage unit performs the recording operation independent of the CPU.

3. The scanning laser microscope according to claim 1, wherein
   said external device is a specimen stimulus device for providing a stimulus for the specimen, and the output signal output by the specimen stimulus device includes a trigger signal for notification of the given stimulus.

4. The scanning laser microscope according to claim 3, wherein
   said specimen stimulus device includes an electric stimulus device.

5. The scanning laser microscope according to claim 3, wherein
   said specimen stimulus device includes a chemicals applying device.

6. The scanning laser microscope according to claim 1, wherein
   said external device is a detector for detecting a state of the specimen, and an external signal output by said detector includes a detection signal indicating the state of the specimen.

7. The scanning laser microscope according to claim 1, wherein
   said data storage unit records the external signal and a time when the external signal is generated in synchronization with a sampling clock in said A/D converter.

8. The scanning laser microscope according to claim 1, wherein
   said display unit displays data read by said CPU.

9. The scanning laser microscope according to claim 1, further comprising:
a second display unit displaying the data read by said CPU.

10. A scanning laser microscope, comprising:
a scanner unit performing two-dimensional scanning on a specimen using a light beam;
a photodetector unit detecting a light from the specimen;
an A/D converter converting an output signal from said photodetector unit into a digital signal;
a CPU controlling said scanner unit and generating image data of the specimen from the digital signal output from said A/D converter;
a display unit displaying the image data;
an electric stimulus device applying a stimulus to the specimen, and outputting a trigger signal for notification of a given stimulus;
a data storage unit, connected to said electric stimulus device, recording a time when the trigger signal is output during scanning using the light beam, wherein
the data stored in said data storage unit is read by said CPU after scanning using the light beam.

11. The scanning laser microscope according to claim 10, wherein
said CPU reads the data stored in said data storage unit, performs a visualizing process, and displays a result on a display unit.

12. The scanning laser microscope according to claim 11, wherein
said data storage unit comprises a latch unit latching the trigger signal in synchronization with a sampling clock in said A/D converter.

13. The scanning laser microscope according to claim 11, wherein
said data storage unit comprises a memory unit storing the trigger signal in synchronization with a sampling clock in said A/D converter.

14. A method for storing an external signal, comprising:
an external signal output from an external device and a time when the external signal is input are stored in a data storage unit operating independent of a CPU, which performs at least a control process of two-dimensional scanning on a specimen using a light beam and a process of generating image data from an electric signal obtained by performing a photoelectric converting process on a light from the specimen, when the CPU is in a high load state; and
the external signal output from said external device and the time when the external signal is input, which are stored in said data storage unit, are read by said CPU from said data storage unit when the CPU is in a low load state.

* * * * *